A. E. HEGARDT.
FLEXIBLE RULE.
APPLICATION FILED DEC. 8, 1916. RENEWED JAN. 14, 1918.
1,313,482. Patented Aug. 19, 1919.
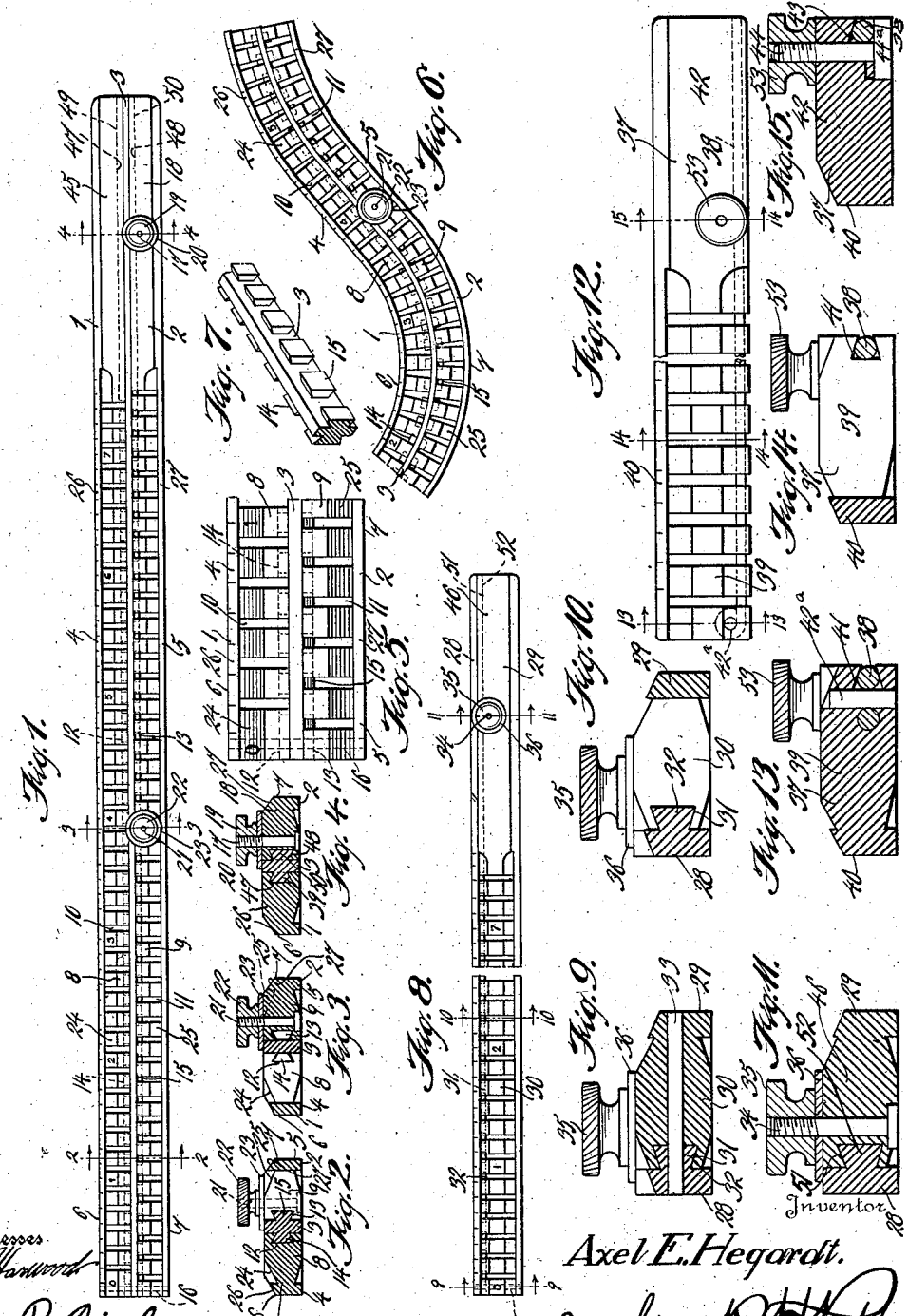
Witnesses
H. Hanward
C. R. Ziegler.
Inventor
Axel E. Hegardt.
By Joshua R. H. Potts.
His Attorney

UNITED STATES PATENT OFFICE.

AXEL E. HEGARDT, OF PHILADELPHIA, PENNSYLVANIA.

FLEXIBLE RULE.

1,313,482.      Specification of Letters Patent.      Patented Aug. 19, 1919.

Application filed December 8, 1916, Serial No. 135,889. Renewed January 14, 1918. Serial No. 211,801.

*To all whom it may concern:*

Be it known that I, AXEL E. HEGARDT, a citizen of the United States, residing at Philadelphia, in the county of Philadelphia and State of Pennsylvania, have invented certain new and useful Improvements in Flexible Rules, of which the following is a specification.

My invention consists of an improved flexible rule. One object of my invention is to provide a rule of the above described type which may be freely and accurately bent to conform to any desired curve.

Another object of my invention is to provide means for holding the rule in its bent condition so that it can be handled and used while in said bent position.

Another object of my invention is to include in my improved rule, a number of elongated members made of resilient material and which when in their normal state, are straight, so that if they are bent into a curve as above described, they will automatically return to their normal positions when released by said holding means.

A further object is to provide my improved rule with one or more smooth outer edges which may be used as ruling edges by draftsmen or others who use my improved rule as a drawing instrument.

These objects, and other advantageous ends which will be described hereinafter, I attain in the following manner, reference being had to the accompanying drawings in which—

Figure 1 is a top plan view of my improved flexible rule.

Fig. 2 is an enlarged transverse section on the line 2—2 of Fig. 1.

Fig. 3 is an enlarged transverse section on the line 3—3 of Fig. 1.

Fig. 4 is an enlarged transverse section taken on the line 4—4 of Fig. 1.

Fig. 5 is an enlarged fragmentary top plan view of one end of the rule shown in Fig. 1.

Fig. 6 is a fragment of the rule shown in Fig. 1 showing the same bent to form a curve.

Fig. 7 is a fragmentary perspective view of one of the elements disclosed in said previous figures.

Fig. 8 is a top plan view partly broken away showing a modified form of my improved rule.

Fig. 9 is an enlarged transverse section taken on the line 9—9 of Fig. 8.

Fig. 10 is an enlarged transverse section taken on the line 10—10 of Fig. 8.

Fig. 11 is an enlarged transverse section taken on the line 11—11 of Fig. 8.

Fig. 12 is a top plan view partly broken away showing another form of my invention.

Fig. 13 is an enlarged sectional view taken on the line 13—13 of Fig. 12.

Fig. 14 is a transverse sectional view taken on the line 14—14 of Fig. 12, and

Fig. 15 is an enlarged transverse sectional view taken on the line 15—15 of Fig. 12.

Referring to Figs. 1 to 7 inclusive, my improved rule includes three elongated members 1, 2, and 3. The members 1 and 2 throughout the greater portion of their length include continuous strips 4 and 5, the outer surfaces 6 and 7 thereof being smooth and capable of being used as ruling surfaces in a manner hereinafter more fully described.

Each of the strips 4 and 5 has projecting inwardly, a series of lugs 8 and 9 respectively. The lugs of each series are spaced apart to provide spaces 10 and 11 respectively.

Furthermore, the lugs 8 are so positioned as to be directly and centrally opposite the spaces 11 between the lugs 9 and vice versa the lugs 9 are directly and centrally opposite the spaces 10 between the lugs 8, these positions being attained when the strips 4 and 5 are in their straight position as shown in Figs. 1 and 5.

The lugs 8 and 9 at their inner surfaces have undercut or dove-tailed recesses 12 and 13 respectively which form slide-ways for two series of dove-tailed tongues 14 and 15 which project outwardly from opposite surfaces of the centrally extending member 3. These tongues 14 and 15 are oppositely disposed and are of greater width than the spaces 10 and 11 between the lugs 8 and 9 for a purpose hereinafter more fully described.

The members 1, 2, and 3, are preferably made of celluloid, hard rubber, or other material which when it is bent from the straight position shown in Fig. 1, will automatically spring back into said straight position when released while in said bent position.

The member 3 is preferably made comparatively thin, and has its opposite faces flat and in sliding engagement with the innermost surfaces of the lugs 8. The members 1, 2, and 3, at one end of the rule, are secured against relative longitudinal movement by means of a transversely extending pin 16 (see Figs. 1 and 5). The other portions of said members 1, 2, and 3, may normally slide relatively to each other when the rule is bent and during this relative sliding movement, it will be noted that the tongues 14 and 15 will slide within the recesses 12 and 13 and across the spaces 10 and 11, but as hereinbefore stated, the width of the tongues 14 and 15 is greater than the width of said spaces, hence each tongue will always have a portion of its length within one of the recesses 12 or 13 even though it moves from the recess of one lug to the recess of another lug, so that it will be impossible for my improved rule to have the several elements jam at any point or points throughout its length.

The movement on the contrary is extremely smooth and regular which permits of the accurate conformation of the rule to suit or register with any curve.

For the purpose of holding the several parts in their bent or curved positions, I provide a clamping screw or bolt 17, which as illustrated in Fig. 1, extends through the solid end portion 18 of the member 2 and has a thumb nut 19 which is designed to bear upon a washer 20, the latter extending across the parting between the members 2 and 3 so as to frictionally engage said latter members and lock them together when the thumb nut 19 is tightened.

In Fig. 1, I have also shown a clamping screw 21 which extends through one of the lugs 9 (see Figs. 1 and 3) and this clamping screw has a thumb nut 22 thereon which engages a washer 23 of similar construction to the washer 20 which is designed to clamp the central member 3 to the member 2.

It will thus be understood that when either of the thumb nuts 19 and 22 is loose on its screw, the rule may be bent into a curve. However, if the rule is thus bent, and the thumb nuts 19 and 22 are tightened, it will be impossible for the members 1, 2, and 3, to spring back into their normal straight position. Thus the several parts will be held in their curved positions, such for example as shown in Fig. 6.

For convenience to the user, the strip 4 is graduated into inches and fractional parts of inches, and thus by my improved rule the length of any curve may be determined merely by setting the rule to the proper curve and then reading the length of the curve on the graduated edge.

It will be noted that any number of clamping screws such for example as 17 and 21 may be employed or only one may be used if so desired, either one of the screws above mentioned being eliminated.

The lugs 8 and 9 are preferably beveled as shown at 24 and 25, and this beveling greatly facilitates the holding of the rule. Furthermore, the strips 4 and 5 are beveled on their upper surfaces as shown at 26 and 27 which reduces the width of the surfaces 6 and 7, so that a draftsman's ruling pen may be readily used in connection therewith. This feature will be appreciated by draftsmen who generally prefer a narrow ruling edge to a wide or deep one.

It will thus be noted that by the spacing of the lugs 8 and 9, and the disposition of the tongues 14 and 15, extremely narrow strips of material are required to be bent when it is desired that the rule conform to a certain curve, so that my improved rule is extremely flexible but is so constructed that it is strong and easily manipulated.

In Figs. 8 to 11 inclusive, I have shown my improved rule including only two elongated members 28 and 29. The member 29 is of similar construction to the member 2 above described in connection with Figs. 1 to 7 inclusive, and the member 28 may be considered to be identical with the member 3 with one series of the tongues eliminated. In other words, the member 29 in Figs. 8 to 11 has lugs 30 which at their inner surfaces are recessed as shown at 31 to provide undercut or dove-tailed slide-ways for dove-tailed tongues 32 on the inner surface of the member 28.

A transverse pin 33 extends through the members 28 and 29 adjacent one end (see Figs. 8 and 9), and prevents relative longitudinal movement between said members 28 and 29 at one end of the rule. Adjacent the opposite end, I provide a clamping screw 34 and a thumb nut 35 which engages a washer 36, the latter spanning the parting between the members 28 and 29 and frictionally engaging the upper surfaces of said two latter members, so that when the nut 35 is tightened, relative movement between said members 28 and 29 is prevented.

It will be noted that the pressure exerted by the thumb nuts, both in connection with Figs. 1 to 7 and Figs. 8 to 11, is sufficient to compress the material to provide the necessary friction. While I have shown only one clamping screw and only one thumb nut on Fig. 8, it will be noted that two or more may be used as shown in connection with Fig. 1.

In Figs. 12 to 15 inclusive, I have shown another form of my invention in which only two longitudinally extending members 37 and 38 are employed, the member 38 in the present instance being in the form of a resilient wire which extends throughout the length of the member 37 as clearly shown in Fig. 12.

The member 37 includes a series of lugs 39 which are spaced apart in the same manner as either of the series of lugs 8 or 9 above described, and extend from an outward ruling strip 40. The free end portions of the lugs 39 have under-cut recesses providing dove-tailed slide-ways 41 through which the wire 38 extends and relatively slides. One end of the wire is coiled around a pin 42$^a$ so as to prevent relative longitudinal movement between the wire 38 and member 37 at one end. The wire 38 passes through the slide-ways 41 in all of the lugs 39 and also through a dove-tailed groove 43 in the head 42 of the rule.

A clamping screw 44 has a lower headed end 44$^a$ which is designed to engage the under portion of the wire and clamp it in frictional contact with said head 42 as shown in Fig 15.

It will be noted that the head 42 in Fig. 12 corresponds with the head 45 in Fig. 1, and the head 46 in Fig. 8. The head 45 of Fig. 1 comprises the free sliding ends of the members 1, 2, and 3, the members 1 and 2 having dove-tailed grooves 47 and 48 respectively through which slide dove-tailed extensions 49 and 50 which project laterally from the sides of the member 3 adjacent its free sliding end.

In the same manner, the head 46 in Fig. 8 comprises the free sliding ends of the members 28 and 29, the latter having a dove-tailed recess 51 through which slides a dove-tailed extension 52 on the inner side of the member 28. Furthermore, it will be noted that the clamping screws and their coöperative elements in addition to forming the frictional contact through the medium of the washers as above described, act to squeeze the portions providing the dove-tailed recesses into clamping engagement with the dove-tailed tongues which slide therethrough and in some instances I may dispense with the washers for example as shown in the construction of the nut 53 in Figs. 12 to 15 inclusive, but in any event clamping means is provided to prevent relative movement between the slidable members when the rule is bent into a curved position.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A flexible rule comprising elongated members slidable relatively to each other, lugs extending laterally from certain of said members and having their outer ends spaced apart and provided with dove-tailed recesses, other of said members having dove-tailed tongues spaced apart and slidable within said recesses, and clamping means designed to compress the portions which provide the dove-tailed recesses to bind the dove-tailed tongues therein, substantially as described.

2. A flexible rule having three longitudinally extending members, two of said members being spaced apart by the other member, said two members including flexible strips and lugs extending laterally from each of said strips, said lugs having recesses in their adjacent outer ends, the other of said members being slidable between the first two mentioned members and having tongues on opposite sides slidably fitting the respective recesses of each of said two members, and clamping means for securig said members against longitudinal movement, substantially as described.

3. A flexible rule having three longitudinally extending members, two of said members including flexible strips and lugs extending laterally from each of said strips, said lugs having recesses in their adjacent outer ends, the other of said members being slidable between the first two mentioned members and having tongues on opposite sides slidably fitting said recesses, and clamping means designed to compress the portions which provide the recesses to bind the tongues within said recesses, substantially as described.

4. A flexible rule having three longitudinally extending members, two of said members including flexible strips and lugs extending laterally from each of said strips, said lugs having recesses in their adjacent outer ends, the other of said members being slidable between the first two mentioned members and having tongues on opposite sides slidably fitting said recesses, and clamping means extending through certain of said lugs, said clamping means being designed to compress the recessed portions of said lugs to bind the tongues therein, substantially as described.

5. A flexible rule having three longitudinally extending members, two of said members including resiliently flexible strips and lugs extending laterally from each of said strips, said lugs having recesses in their adjacent outer ends, the other of said members being slidable between the first two mentioned members and having tongues on opposite sides slidably fitting said recesses, and clamping means designed to compress the portions which provide the recesses to bind the tongues within said recesses, substantially as described.

6. A flexible rule having three longitudinally extending members, two of said members including flexible strips, and lugs extending laterally from said strips, said lugs having recesses in their outer ends, the other of said members being slidable between the first two mentioned members and having tongues slidably fitting said recesses, said tongues being oppositely disposed, the lugs of one of said members being opposite the spaces between the lugs of the other of said members when the rule is in its straight position, and clamping means for securing said members against longitudinal movement, substantially as described.

7. A flexible rule having three longitudinally extending members, two of said members including flexible strips, and lugs extending laterally from said strips, said lugs having recesses in their outer ends, the other of said members being slidable between the first two mentioned members and having tongues slidably fitting said recesses, said tongues being oppositely disposed, the lugs of one of said members being opposite the spaces between the lugs of the other of said members when the rule is in its straight position, said tongues being of greater width than the spaces between said lugs, and clamping means for securing said members against longitudinal movement, substantially as described.

In testimony whereof I have signed my name to this specification in the presence of two subscribing witnesses.

AXEL E. HEGARDT.

Witnesses:
RHODA E. GILLIES,
CHAS. E. POTTS.

Copies of this patent may be obtained for five cents each, by addressing the "Commissioner of Patents, Washington, D. C."